United States Patent
Kojima (10) Patent No.: US 11,281,926 B2
(45) Date of Patent: Mar. 22, 2022

(54) FEATURE EXTRACTION METHOD AND APPARATUS

(71) Applicant: DENSO CORPORATION, Kariya (JP)

(72) Inventor: Shinya Kojima, Kariya (JP)

(73) Assignee: DENSO CORPORATION, Kariya (JP)

( * ) Notice: Subject to any disclaimer, the term of this patent is extended or adjusted under 35 U.S.C. 154(b) by 221 days.

(21) Appl. No.: 16/430,045

(22) Filed: Jun. 3, 2019

(65) Prior Publication Data

US 2019/0370592 A1 Dec. 5, 2019

(30) Foreign Application Priority Data

Jun. 4, 2018 (JP) .............................. JP2018-107022
Feb. 8, 2019 (JP) .............................. JP2019-021734

(51) Int. Cl.
| | | |
|---|---|---|
| *G06K 9/00* | (2006.01) | |
| *G06K 9/32* | (2006.01) | |
| *G06K 9/46* | (2006.01) | |
| *G06T 7/11* | (2017.01) | |
| *G06T 7/13* | (2017.01) | |
| *G06T 7/143* | (2017.01) | |

(52) U.S. Cl.
CPC ....... *G06K 9/3241* (2013.01); *G06K 9/00523* (2013.01); *G06T 7/11* (2017.01)

(58) Field of Classification Search
None
See application file for complete search history.

(56) References Cited

U.S. PATENT DOCUMENTS

| | | | | |
|---|---|---|---|---|
| 9,940,515 | B2 * | 4/2018 | Callegari | .................. G06K 9/20 |
| 2010/0034459 | A1 * | 2/2010 | Ito | .......................... G06K 9/6212 |
| | | | | 382/168 |
| 2010/0034465 | A1 * | 2/2010 | Watanabe | ............. G06K 9/6202 |
| | | | | 382/190 |
| 2011/0069896 | A1 * | 3/2011 | Ishiga | ...................... G06F 16/51 |
| | | | | 382/224 |
| 2011/0194748 | A1 * | 8/2011 | Tonomura | ........... G01S 7/52074 |
| | | | | 382/131 |
| 2012/0045094 | A1 * | 2/2012 | Kubota | ................ G06K 9/3233 |
| | | | | 382/103 |

(Continued)

FOREIGN PATENT DOCUMENTS

| | | |
|---|---|---|
| JP | 2010-044438 A | 2/2010 |
| JP | 2010-044439 A | 2/2010 |
| JP | 2011-118832 A | 6/2011 |

*Primary Examiner* — Soo Shin
(74) *Attorney, Agent, or Firm* — Maschoff Brennan (57) ABSTRACT

In a feature extraction apparatus, a small region setter divides an object region set in a captured image into small regions smaller in size than the object region. A small region extractor extracts, from each small region, a small-region feature that has two or more feature parameters associated with the corresponding small region. A feature calculator calculates a product of a first feature representing the small-region feature of a first small region selected as a target region from the small regions, and a second feature representing the small-region feature of a second small region in the small regions, the second small region having a predetermined positional relationship with the first small region. The feature calculator obtains, based on the product of the first feature and the second feature, an image feature for the first small region as the target region.

10 Claims, 5 Drawing Sheets

(56) References Cited

U.S. PATENT DOCUMENTS

| | | | |
|---|---|---|---|
| 2013/0063468 A1* | 3/2013 | Hikida | G06T 7/11 345/589 |
| 2014/0233826 A1* | 8/2014 | Agaian | G06K 9/46 382/133 |
| 2015/0010237 A1* | 1/2015 | Nomura | G06K 9/3241 382/195 |
| 2016/0117840 A1* | 4/2016 | Yamamoto | G06K 9/00342 382/103 |
| 2016/0140399 A1* | 5/2016 | Yano | G06T 7/593 382/103 |
| 2016/0239984 A1* | 8/2016 | Watanabe | G06F 16/24578 |
| 2017/0309024 A1* | 10/2017 | Kitamura | G06T 7/0012 |
| 2019/0370592 A1* | 12/2019 | Kojima | G06T 7/13 |

\* cited by examiner

FEATURE EXTRACTION METHOD AND APPARATUS

CROSS REFERENCE TO RELATED APPLICATION

This application is based on and claims the benefit of priority from Japanese Patent Applications No. 2018-107022 filed on Jun. 4, 2018 and No. 2019-021734 filed on Feb. 8, 2019, the disclosure of each of these applications is incorporated in its entirety herein by reference.

TECHNICAL FIELD

The present disclosure relates to feature extraction apparatuses and methods for extracting features, i.e. feature values, used to recognize objects in a captured image, and to object recognition apparatuses for recognizing objects in a captured image.

BACKGROUND

An example of technologies recognizing the type of an object in a captured image, which have been well known, obtains, for each pixel of a captured image, a positional relationship between a feature of the pixel and a feature of a selected pixel that represents a mapping of the pixel, located away from the pixel by predetermined number of pixels.

SUMMARY

A feature extraction apparatus includes a feature calculator calculates a product of a first feature representing a small-region feature of a first small region selected as a target region from small regions, and a second feature representing a small-region feature of a second small region in the small regions. The second small region has a predetermined positional relationship with the first small region. The feature calculator obtains, based on the product of the first feature and the second feature, an image feature for the first small region as the target region.

BRIEF DESCRIPTION OF THE DRAWINGS

Other aspects of the present disclosure will become apparent from the following description of embodiments with reference to the accompanying drawings in which.

DETAILED DESCRIPTION OF EMBODIMENT

Inventor's View Point

Technologies recognizing the type of an object in a captured image have been well known, one of which is disclosed in Japanese Patent Application Publication No. 2010-044439. The technology disclosed in the published patent document obtains, for each pixel of a captured image, a positional relationship between a feature of the pixel and a feature of a selected pixel that represents a mapping of the pixel, located away from the pixel by predetermined number of pixels. Then, the technology calculates a precise feature of each pixel of the captured image in accordance with the obtained correlation for the pixel, and recognizes an object in the captured image based on the calculated precise feature.

As a result of detailed consideration of the above technology, the inventor of this application has found out that shifting or turning of an object may change the positional relationship between each pixel and a selected pixel, which represents a mapping of the pixel. The change in the positional relationship may result in lowering of the accuracy of calculating the features of the captured image. Additionally, if the feature of each pixel of an image is comprised of multidimensional parameters, the above technology may need a large number of combinations of the multidimensional parameters for obtaining a feature of the image, resulting in an increase in a processing time and load required to calculate the feature of the image.

In view of the circumstances set forth above, a first aspect of the present disclosure seeks to provide feature extraction methods and apparatuses, and object recognition apparatuses, each of which is capable of improving the accuracy of calculating features of a captured image.

A feature extraction apparatus according to an exemplary aspect includes a small region setter that divides an object region set in a captured image into small regions smaller in size than the object region. The feature extraction apparatus includes a small region extractor that extracts, from each small region, a small-region feature that has two or more feature parameters associated with the corresponding small region. The feature extraction apparatus includes a feature calculator calculates a product of a first feature representing the small-region feature of a first small region selected as a target region from the small regions, and a second feature representing the small-region feature of a second small region in the small regions, the second small region having a predetermined positional relationship with the first small region. The feature calculator obtains, based on the product of the first feature and the second feature, an image feature for the first small region as the target region.

The feature extraction apparatus obtains, for each small region, the imaging feature. This configuration therefore reduces an adverse effect on calculation of the imaging feature due to shifting or turning of the target object, as compared with obtaining, for each pixel of a captured image, a feature. This therefore increases the accuracy of calculating the image feature for the first small region.

The feature extraction apparatus simply calculates the product of the first feature for the first small region and the second feature for the second small region to thereby obtain the image feature for the first small region. This therefore prevents the number of elements included in the image feature from excessively increasing, thus improving the accuracy of calculating the image feature of the target region.

Embodiment

According to the inventor's view point, the following describes an exemplary embodiment of the present disclosure with reference to the accompanying drawings. In the exemplary embodiment and its modifications, like parts between the exemplary embodiment and its modifications are omitted or simplified to avoid redundant description.

Figure 1:
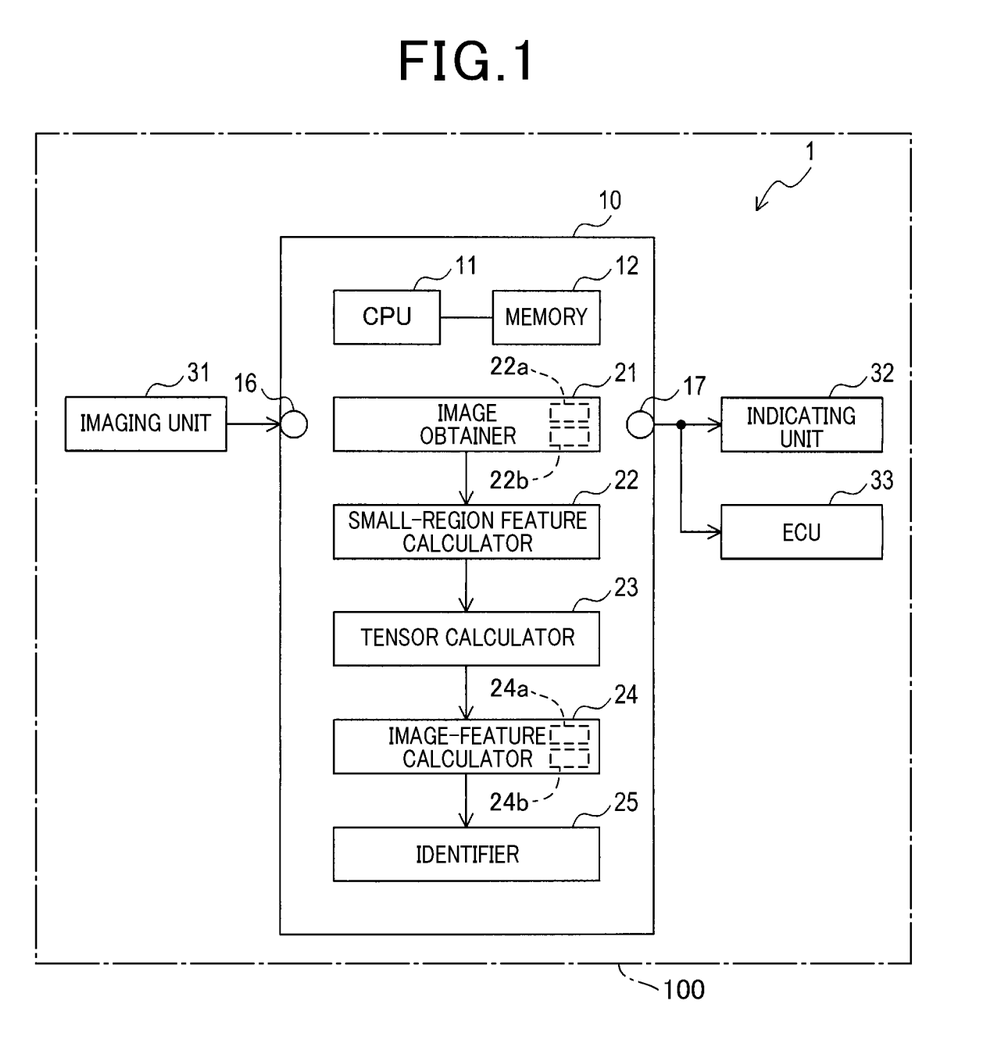
FIG. 1 is a block diagram schematically illustrating an example of the schematic structure of an image processing apparatus according to an exemplary embodiment of the present disclosure.

Structure FIG. 1 is a block diagram illustrating an example of the schematic structure of an image processing apparatus 1 according to the exemplary embodiment of the present disclosure. For example, the image processing apparatus 1 is installed in a vehicle, such as a passenger vehicle or truck, V, and has a function of identifying, i.e. recognizing, the types, sizes, and locates of one or more objects located in a forward region with respect to the vehicle 100 in its travelling direction.

Referring to FIG. 1, the image processing apparatus 1 includes a processor 10. The image processing apparatus 1 can include an input unit 16, an output unit 17, an imaging unit 31, an indicating unit 32, and an electronic control unit (ECU) 33; these units 16, 17, 31, 32, and 33 are communicably connected to the processor 10.

The input unit 16 serves as an interface circuit having a function of enabling the processor 10 to communicate with the imaging unit 31. The output unit 17 serves as a transmission circuit having a function of transmitting, to at least one of the indicating unit 32 and the ECU 33, data including, for example, recognition results of one or more target objects to be detected.

The imaging unit 31 is located to the vehicle 100 to have an imaging region located around the vehicle 100. In particular, the imaging unit 31 is located to the vehicle 100 such that a front region or a rear region of the vehicle 100 in its travelling direction is set to the imaging region. The imaging unit 31 is configured to repeatedly capture images of the imaging region, and send, to the processor 10 via the input unit 16, captured images in digital format or an analog format.

Specifically, the imaging unit 31 is comprised of a plurality of light receiving elements, which respectively correspond to a plurality of pixels, two-dimensionally arranged in both vertical and horizontal directions corresponding to the respective height and width directions of the vehicle 100. The two-dimensionally arranged pixels constitute a light receiving surface of the imaging unit 31.

For example, the imaging unit 31 is designed as a commonly available imaging unit comprised of a lens system configured to focus light incident from the imaging region as a front or a rear view directed from the vehicle 100 on the light receiving surface of the imaging unit 31. The imaging unit 31 is configured to receive light focused on the light receiving surface thereof during a controllable shutter time, i.e. an exposure duration, so that each of the two-dimensionally arranged light-sensitive elements (pixels) receives a corresponding light component. The imaging unit 31 converts, using each of the light receiving elements, a corresponding received light component into an electrical charge, i.e. an electrical signal, corresponding to the intensity of the received light component, thus outputting the electric signals as received light data, i.e. one frame image showing the imaging region with respect to the vehicle 100. That is, the imaging unit 31 is configured to repeatedly, i.e. cyclically, perform the above capturing process to thereby capture frame images each comprised of, for each pixel, the intensity of the corresponding received light component. Then, the imaging unit 31 sends, to the processor 10 via the input unit 16, the captured frame images, each of which has a digital luminance value or an analog luminance value as a luminance value, i.e. a pixel value, for each pixel thereof.

The indicating unit 32 is comprised of, for example, a display and indicators. The indicating unit 32 obtains object recognition results from the processor 10 described in detail later, and indicates, to a driver of the vehicle 100, the received results using at least one of the display as images and/or messages, or the indicators as illuminated light.

As described above, the processor 10 is connected to the input unit 16, output unit 17, imaging unit 31, indicating unit 32, and ECU 33 by radio or an in-vehicle network via at least one of the input unit 16 and the output unit 17. The processor 10 is configured to perform various tasks including a task of identifying, in a captured frame image sent from the imaging unit 31, the type, size, and location of at least one target object, to correspondingly send, to the indicating unit 32, the identification results.

For example, the processor 10 includes at least one microcomputer comprised of a CPU 11 and a memory 12 comprised of, for example, a RAM and a ROM. The CPU 11 runs one or more programs stored in, for example, the ROM of the memory 12, thus implementing various functions corresponding to the one or more programs. That is, the memory 12 serves as, for example, a non-transitory storage medium storing one or more programs. In other words, the CPU 11 runs one or more programs stored in the memory 12, thus carrying out various methods corresponding to the one or more programs. Note that the non-transitory storage medium is defined as a storage medium without transitory media, such as electromagnetic waves.

Note that the memory 12 stores learning models W, which respectively serves as, for example, comparative reference tensors, previously obtained for respective plural types of target objects to be recognized by the processor 10. Each of the learning models W has been prepared for the corresponding one of the types of target objects based on a known available learning algorithm, such as a Support Vector Machine (SVM) model. The SVM model for example consists of a plurality of classifiers that are connected to one another in a predetermined connection pattern, such as a cascade connection pattern. Like a known neural-network algorithm, connection weight parameters between the classifiers are set to given values; the values of the connection weight parameters have been trained.

Specifically, each of the learning models W represents data to be compared with features obtained in a captured image according to the exemplary embodiment. If each learning model W is designed to use linear classifiers, each learning model W serves as reference data to be compared with data of each feature obtained in the exemplary embodiment. Each learning model W can be comprised of a reference tensor to be compared with data of each feature obtained in the exemplary embodiment. Each learning model W can be stored in another storage medium except for the memory 12.

Referring to FIG. 1, the processor 10 functionally includes an image obtainer 21, a small-region feature calculator 22, a tensor calculator 23, an image-feature calculator 24, and an identifier 25. The CPU 10 of the processor of the exemplary embodiment can execute a feature extraction program stored in the memory 12 to thereby implement these functional blocks 21 to 24. The CPU 10 can execute an identification program stored in the memory 12 to thereby implement the functional block 25.

That is, at least part of all functions provided by the processor 10 can be implemented by at least one processor; the at least one processor can be comprised of (1) The combination of at least one programmed processing unit, i.e. at least one programmed logic circuit, and at least one memory including software that causes the at least one programed logic circuit to implement all the functions (2) At least one hardwired logic circuit that implements all the functions (3) At least one hardwired-logic and programmed-logic hybrid circuit that implements all the functions How the Processor Works Next, the following describes the functional modules 21 to 25 implemented by the processor 10 in detail.

Image Obtainer

The processor 10 serves as the image obtainer 21 to obtain a captured frame image, each of which has a digital luminance value or an analog luminance value as a pixel value for each pixel thereof, sent from the imaging unit 31. Then, the processor 10 serves as the image obtainer 21 to temporarily store the obtained frame image in the memory 12.

Small-Region Feature Calculator

Following the operation by the image obtainer 21, the processor 10 serves as the small-region feature calculator 22 to calculate small-region features.

Figure 2A:
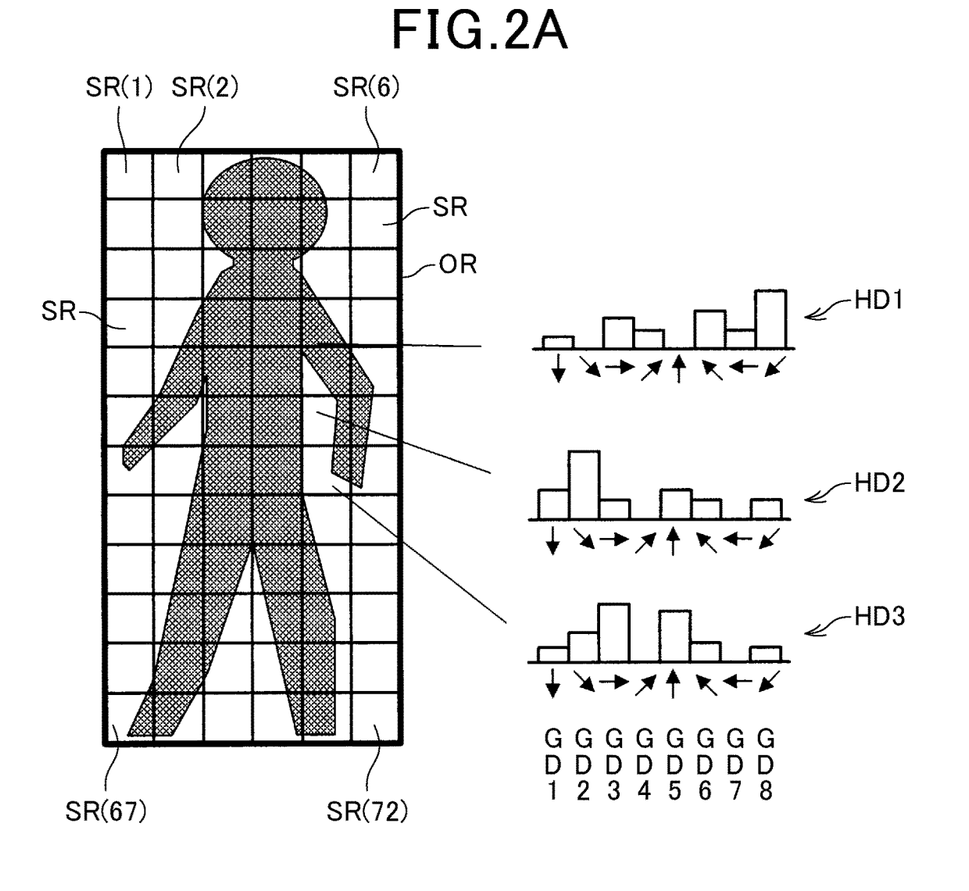
FIG. 2A is an explanation view schematically illustrating an example of small regions included in an object region according to the exemplary embodiment.

Specifically, as illustrated in FIG. 2A, the processor serves as the small-region feature calculator 22 to (1) Set, in the captured image, an object region (see reference character OR in FIG. 2A) in which a target object is predicted to be located (2) Divide the object region into small regions each comprised of a predetermined number of pixels The size of each small region has a predetermined size smaller than the size of the light receiving surface of the imaging unit 31.

For example, the small-region feature calculator 22 identifies, based on the luminance values of a captured image, an object region OR in which a target object is recognized to be located, and clips, from the captured image, the object region OR.

As another example, the small-region feature calculator 22 extracts edges in the captured image based on the luminance values of the captured image; each of the edges represents a boundary between the luminance values in the captured image. Then, the small-region feature calculator 22 recognizes, based on the extracted edges, location of a target object in the captured image, and sets an object region OR enclosing therein at least part of the recognized target object. Thereafter, the small-region feature calculator 22 clips, from the captured image, the object region OR.

FIG. 2A schematically illustrates an example of small regions SR in the captured image CI. Each small region SR can have a two-dimensional array size comprised of (H×V) in the horizontal and vertical directions of the vehicle 100 respectively corresponding to the horizontal and vertical directions of the light receiving elements of the imaging unit 31. Reference character H represents the number of pixels of each small region SR in the horizontal direction, which will be referred to simply as a horizontal pixel number H, and reference character V represents the number of pixels of the corresponding small region SR in the vertical direction, which will be referred to simply as a vertical pixel number V. The horizontal pixel number H of each small region SR and the vertical number pixel V of the corresponding small region SR can be set to be identical to each other. Alternatively, the horizontal pixel number H of each small region SR and the vertical number pixel V of the corresponding small region SR can be set such that the ratio of the horizontal pixel number H to the vertical number pixel V is set to a predetermined ratio; the predetermined ratio of the horizontal pixel number H to the vertical number pixel V of each small region SR enables the shape of the corresponding small region SR to have a substantially square shape.

Then, the processor 10 serves as the small-region feature calculator 22 to extract a small-region feature from each small region SR. The small-region feature in each small region SR represents, for example, a feature including plural parameters, i.e. feature parameters, associated with the corresponding small region SR. For example, the small-region feature in each small region SR is expressed as a vector according to the exemplary embodiment, but can be expressed as a scalar, or can be expressed as a tensor, each component of which is expressed as a vector.

In detail, as illustrated in FIG. 2A, the small-region feature in each small region SR is comprised of a luminance-value gradient direction histogram, i.e. a histogram of luminance-value gradient directions, for each of the pixels constituting the corresponding small region SR. Note that, as illustrated in FIG. 2B, a luminance-value gradient direction for a target pixel TP included in a freely selected small region SR represents which of gradient directions GD1 to GD8 from the target pixel TP to respective eight adjacent pixels AP1 to AP8 in which there is the largest change in luminance value.

Figure 2B:
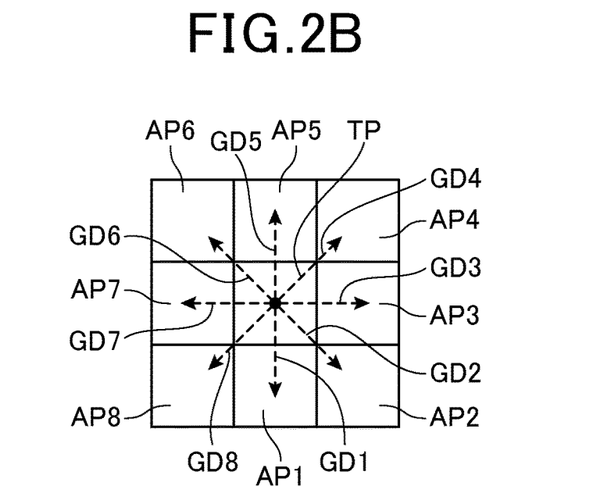
FIG. 2B is an explanation view schematically illustrating gradient directions from a target pixel to respective eight adjacent pixels according to the exemplary embodiment.

Specifically, as illustrated in FIG. 2B, the target pixel TP has

1. The gradient direction GD1 from the target pixel TP to the lower adjacent pixel AP1

2. The gradient direction GD2 from the target pixel TP to the lower right adjacent pixel AP2

3. The gradient direction GD3 from the target pixel TP to the right adjacent pixel AP3

4. The gradient direction GD4 from the target pixel TP to the upper right adjacent pixel AP4

5. The gradient direction GD5 from the target pixel TP to the upper adjacent pixel AP5

6. The gradient direction GD6 from the target pixel TP to the upper left adjacent pixel AP6

7. The gradient direction GD7 from the target pixel TP to the left adjacent pixel AP7

8. The gradient direction GD8 from the target pixel TP to the lower left adjacent pixel AP8

For example, the luminance-value gradient direction for a target pixel TP included in a freely selected small region SR represents which of the gradient directions GD1 to GD8 from the target pixel TP to the respective eight adjacent pixels AP1 to AP8 in which there is the smallest change, i.e. the darkest change, in luminance value.

That is, in a selected small region SR, the pixels respectively have one of the gradient directions GD1 to GD8 as the luminance-value gradient direction. Thus, in the selected small region SR, the frequency, i.e. how many times, the gradient direction GD1 is set as the luminance-value gradient direction is counted as a first frequency value.

Similarly, in the selected small region SR, the frequency of the gradient direction GD2 being set as the luminance-value gradient direction is counted as a second frequency value, and the frequency of the gradient direction GD3 being set as the luminance-value gradient direction is counted as a third frequency value. Additionally, in the selected small region SR, the frequency of the gradient direction GD4 being set as the luminance-value gradient direction is counted as a fourth frequency value, the frequency of the gradient direction GD5 being set as the luminance-value gradient direction is counted as a fifth frequency value, and the frequency of the gradient direction GD6 being set as the luminance-value gradient direction is counted as a sixth frequency value. Moreover, in the selected small region SR, the frequency of the gradient direction GD7 being set as the luminance-value gradient direction is counted as a seventh frequency value, and the frequency of the gradient direction GD8 being set as the luminance-value gradient direction is counted as an eighth frequency value.

Accordingly, the luminance-value gradient direction histogram for each small region SR represents a histogram, i.e. a statistical graph, that represents a frequency distribution in which (1) A horizontal axis represents the frequency of each of the gradient directions GD1 to GD8 being set as the luminance-value gradient direction (2) A vertical axis represents a bar of each of the gradient directions GD1 to GD8; the length or size of the bar of each of the gradient directions GD1 to GD8 represents the corresponding one of the first to eighth frequency values.

For example, FIG. 2A illustrates that an example of a luminance-value gradient direction histogram HD1 for a first selected small region shows that the height of the bar corresponding to the gradient direction GD8 is the highest in all the heights of the gradient directions GD1 to GD8, so that the gradient direction GD8, i.e. the lower left direction, is most set as the luminance-value gradient direction in the first selected small region SR1.

Similarly, FIG. 2A shows an example of a luminance-value gradient direction histogram HD2 for a second selected small region shows that the height of the bar corresponding to the gradient direction GD2 is the highest in all the heights of the gradient directions GD1 to GD8, so that the gradient direction GD2, i.e. the lower right direction, is most set as the luminance-value gradient direction in the second selected small region.

Additionally, an example of a luminance-value gradient direction histogram HD3 for a third selected small region shows that the height of the bar corresponding to the gradient direction GD3 is the highest in all the heights of the gradient directions GD1 to GD8, so that the gradient direction GD3, i.e. the right direction, is set, with the highest frequency, as the luminance-value gradient direction in third selected small region.

Note that the first to eighth frequency values of the respective gradient directions GD1 to GD8 for each small region SR are expressed as eight parameters of a vector; the vector is referred to as a vector h. That is, the vector h of each of the small regions SR represents a small-region feature of the corresponding one of the small regions SR.

For example, as illustrated in FIG. 2A, let assume that the object region OR is comprised of (6×12) small regions SR, the small region SR located at the upper-left corner of the object region OR serves as a reference point, i.e. a first small region, SR(1) in a first row of the object region OR. Then, the small region SR adjacent to the first small region SR(1) in the right direction in the first row can be expressed as a second small region SR(2), and therefore the small region SR located to be rightmost in the first row can be expressed as a sixth small region SR(6).

Similarly, the small region SR located to be leftmost in the second row can be expressed as a seventh small region SR(7), and therefore the small region SR located at the rightmost in the second row can be expressed as a twelfth small region SR(12). Accordingly, the small region SR located to be leftmost in the twelfth row can be expressed as a sixty-seventh small region SR(67), and therefore the small region SR located at the rightmost in the twelfth row can be expressed as a seventy-second small region SR(72).

Then, the small-region feature, i.e. the small-region feature vector, h of an m-th small region SR relative to the reference point, i.e. the first small region SR(1), in the object region OR can be expressed as hm.

Tensor Calculator

Figure 3:
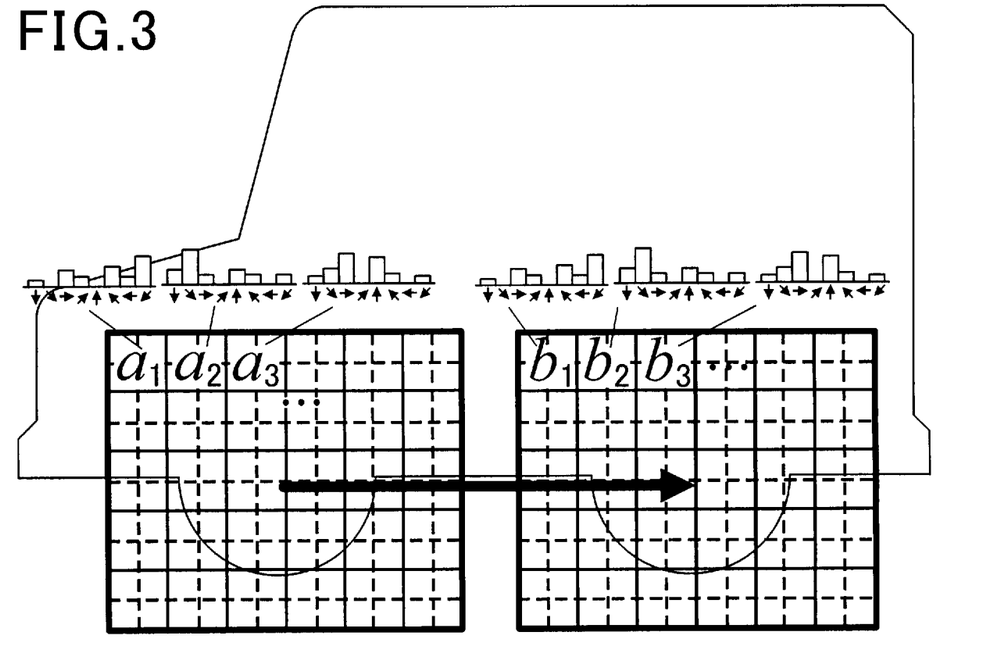
FIG. 3 is an explanation view schematically illustrating mapping of an m-th small region to another small region according to the exemplary embodiment.

Following the operation by the small-region feature calculator 22, the processor 10 serves as the tensor calculator 23 to calculate a tensor TE (m) between the small-region feature vector hm of an m-th small region SR(m) and the small-region feature vector hτ of a τ-th small region relative to the m-th small region SR(m), which is defined as the product, i.e. direct product, of the small-region feature vector hm and the small-region feature vector hτ, in accordance with the following equation (1):

$$TE(m) = (h_m h_{\tau(m)}^T)^{\otimes p} \qquad (1)$$

where
1. Reference character T represents transposition
2. Reference character τ represents mapping of the m-th small region SR(m) to a T-th small region that parallely shifts from the m-th small region SR(m) in the right direction or the lower direction by predetermined pixels, i.e. a predetermined distance
3. Reference character ⊗ represents tensor product, i.e. Kronecker product
4. p represents the order of the Kronecker power For example, FIG. 3 illustrates that mapping of an i-th small region ai in the right direction is expressed by a small region bi. That is, mapping of the small region a1 in the right direction is expressed by b1, and mapping of the small region a2 in the right direction is expressed by b2.

The small-region feature of an i-th small region ai illustrated in FIG. 3 corresponds to $h_m$ in the equation (1) or a first feature described later, and the small-region feature of a small region bi illustrated in FIG. 3 corresponds to $h_{\tau(m)}$ in the equation (1) or a second feature described later.

The equation (1) uses the direct product of the small-region feature vectors as the product of them. In addition, the equation (1) uses the p-th power of the tensor $h_m h_{\tau(m)}^T$ for high-order features of the tensor $h_m h_{\tau(m)}^T$. For example, the equation (1) uses the Kronecker power of the tensor $h_m h_{\tau(m)}^T$.

The p-th order Kronecker power of the tensor $h_m h_{\tau(m)}^T$ represents $A^{\otimes p} = A \otimes A^{\otimes (p-1)}$ where $A = h_m h_{\tau(m)}^T$.

For example, if A is an m×n matrix $a_{ij}$, the Kronecker product $A^{\otimes 2}$ can be obtained by the following equation (2):

$$A^{\otimes 2} = \begin{bmatrix} a_{1,1}A & \cdots & a_{1,n}A \\ \vdots & \ddots & \vdots \\ a_{m,1}A & \cdots & a_{m,n}A \end{bmatrix} \qquad (2)$$

That is, if the small-region feature vector hm has eight-dimensional parameters and the small-region feature vector hτ has eight-dimensional parameters, the number of dimensions of the direct product of the small-region feature vector hm and the small-region feature vector hτ is set to (8×8) dimensions at the highest.

Additionally, an increase in the number p of the Kronecker product enables the higher-order feature for the small region SR(m) to be obtained.

Then, the processor 10 serves as the tensor calculator 23 to set the calculated tensor TE(m), i.e. the p-th order tensor TE(m) of the small-region feature vector hm of the m-th small region SR(m) as an image feature of the m-th small region SR(m).

Image Feature Extractor

Figure 4:
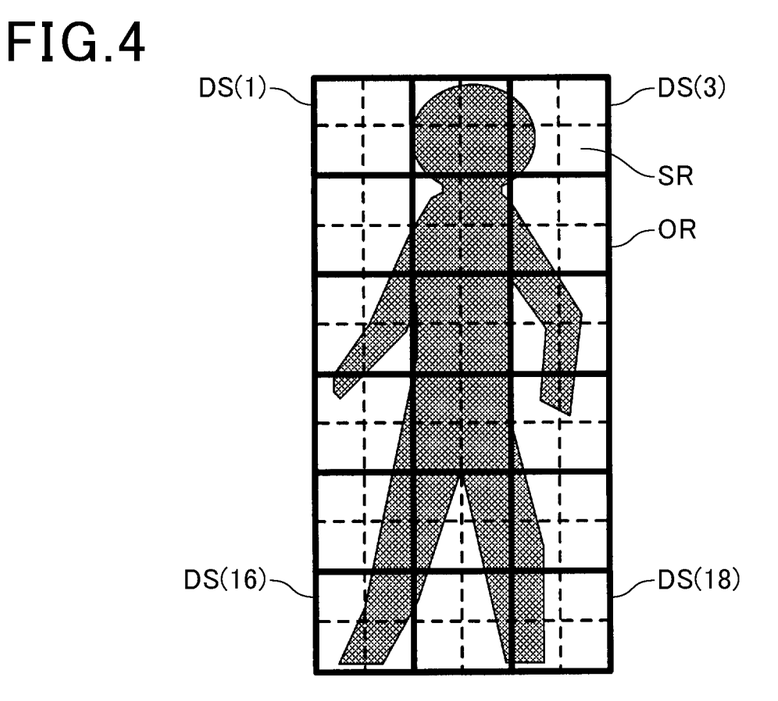
FIG. 4 is an explanation view schematically illustrating an example of divided segments included in the object region according to the exemplary embodiment.

Following the operation by the tensor calculator 23, the processor 10 serves as the image-feature calculator 24 to calculate an image feature in each of divided segments DS in the object region OR. Referring to FIG. 4, the object region OR is comprised of the divided segments DS, in other words, the divided segments DS constitute the object region OR, and each of the divided segments DS is comprised of plural small regions SR. In FIG. 4, thick solid lines represent the divided segments DS, and dashed lines represent the small regions SR. Specifically, FIG. 4 illustrates that each divided segment DS is comprised of four small regions SR.

The image feature in each of the divided segments DS represents that the sum or average of the image features of the respective small regions SR included in the corresponding divided segment DS.

For example, let assume that the object region OR is comprised of (3×8) divided segments DS, the divided segment DS located at the upper-left corner of the object region OR serves as a reference point, i.e. a first divided segment, DS(1) in a first row of the object region OR. Then, the divided segment DS adjacent to the first divided segment DS(1) in the right direction in the first row can be expressed as a second divided segment DS(2), and therefore the divided segment DS located to be rightmost in the first row can be expressed as a third divided segment DS(3).

Similarly, the divided segment DS located to be left most in the second row can be expressed as a fourth divided segment DS(4), and therefore the divided segment DS located at the rightmost in the second row can be expressed as a sixth divided segment DS(6). Accordingly, the divided segment DS located to be left most in the sixth row can be expressed as a sixteenth divided segment DS(16), and therefore the divided segment DS located at the rightmost in the sixth row can be expressed as an eighteenth divided segment DS(18).

Then, the image feature IF(i) in a freely selected i-th divided segment Ci, which is, for example, the sum of the image features of the respective small regions SR included in the i-th divided segment Ci, can be obtained based on the following equation (3):

$$IF(i) = \Sigma_{m \in Ci}(h_m h_{\tau(m)}^T)^{\otimes p} \quad (3)$$

Identifier

Following the operation by the image feature calculator 24, the processor 10 serves as the identifier 25 to perform a task of identifying, for example, the type of the target object contained in the object region OR in accordance with the image features of the respective divided segments Ci and the learning models W stored in the memory 12.

Specifically, the identifier 25 is capable of using one of various available identification methods to thereby identify, for example, the type of the target object contained in the object region OR in accordance with the previously prepared learning models W that uses, for example, each linear classifier.

Note that, as described above, because the image feature in each of the divided segments DS is expressed as a p-th order tensor, each of the learning models W is also designed to have a p-th order tensor.

For example, the identifier 25 calculates the inner product IP of the image feature of the i-th divided segment DS and a selected learning model W for the i-th divided segment DS in accordance with the following equation (4A):

$$IP = \langle W, \{\Sigma_{m \in Ci}(h_m h_{\tau(m)}^T)^{\otimes p}\} \rangle_F \quad (4A)$$

Note that the identifier 25 can calculate the inner product IP of the image feature of the i-th small region and a selected learning model W for the i-th small region in accordance with the following equation (4B):

$$IP = \langle W, (h_m h_{\tau(m)}^T)^{\otimes p} \rangle_F \quad (4B)$$

Note that, in each of the equations (4A) and (4B), reference character F represents Frobenius inner product.

Each of the equations (4A) and (4B) is defined based on the following equation (5):

$$\langle A, B \rangle_F = vec(A)^T vec(B) \quad (5)$$

where each of A and B represents a matrix, vec (A) represents a column vector of the selected learning model W, and vec (B) represents a column vector of the image feature of the i-th divided segment DS.

Specifically, the selected learning model W is expressed as a p-th order tensor, and the image feature in each of the divided segments DS is also expressed as a p-th order tensor.

For example, the identifier 25 can be configured to transform the p-th order tensor of the image feature of the i-th divided segment DS to a vector expression of the image feature of the i-th divided segment DS, in other words, transform the p-th order tensor of the image feature of the i-th divided segment DS to a column vector. Similarly, the identifier 25 is configured to transform the p-th order tensor of the selected learning model W to a column vector expression of the selected learning model W.

Then, the identifier 25 can be configured to calculate, as a scalar value, the inner product of the column vector of the selected learning model W and the column vector of the image feature of the i-th divided segment DS in accordance with the equation (5). That is, the inner product of the column vector of the selected learning model W and the column vector of the image feature of the i-th divided segment DS represents, for example, a similarity level therebetween.

Additionally, the identifier 25 can be configured to transform the p-th order tensors of the image features of the respective divided segments DS to a first column vector, and transform the p-th order tensors of the learning models W prepared for the respective divided segments DS to a second column vector. Then, the identifier 25 can be configured to calculate the inner product of the first column vector and the second column vector to thereby calculate a scalar value indicative of the similarity level between the first column vector and the second column vector. The scalar value will be referred to as a similarity level of the captured frame image.

Thereafter, the identifier 25 determines whether the similarity level of the i-th divided segment DS exceeds a predetermined first threshold previously prepared for the learning model W corresponding to the i-th divided segment DS, or the similarity level of the captured frame image exceeds a predetermined threshold previously prepared for the learning models W of the captured frame image. Upon determining that the first or second similarity level exceeds the corresponding threshold, the identifier 25 identifies the type indicated by the selected learning models W as the type of the target object contained in the divided segment DS or the captured frame image.

As described above, the identifier 25 can be configured to calculate the inner product IP of the image feature of the i-th divided segment DS and each learning model W in accordance with the above equation (4A). This approach based on the equation (4A) will be referred to as a normal approach.

Additionally, the identifier 25 of the exemplary embodiment can be configured to calculate the inner product IP of the image feature of the i-th divided segment DS and a selected learning model W using an alternative approximate approach described hereinafter.

The following describes how the identifier 25 calculates the inner product IP of the image feature of the i-th divided segment DS and the selected learning model W using the alternative approximate approach.

Note that let us assume that the i-th divide region corresponds to the m-th small region for the sake of simple description of the alternative approximate approach, so that the equation (4A) is equivalent to the equation (4B).

First, assuming that the tensor of the selected learning model W has a rank $\gamma$, the identifier 25 performs decomposition of the selected learning model W included in the equation (4B) into a predetermined number of additions of the Kronecker product of first data and second data. The first data represents a predetermined number of first vectors, such as p first vectors, $u_{s,1}, \ldots, u_{s,p}$, and the second data represents a predetermined number of second vectors, such as p second vectors, $v_{s,1}, \ldots, v_{s,p}$. This obtains the result of the decomposition by the following equation (6A):

$$W \approx \Sigma_{S=1}^{\gamma}(u_{s,1} \otimes v_{s,1}) \otimes \ldots \otimes (u_{s,p} \otimes v_{s,p}) \quad (6A)$$

That is, the number p of the first vectors corresponds to the number of the order of the tensor TE(m) calculated by the tensor calculator 23. Similarly, the number p of the second vectors corresponds to the number of the order of the tensor TE(m) calculated by the tensor calculator 23.

Then, the equation (4B) can be expressed by the following equation (6B) in accordance with the equation (6A):

$$IP = \langle \Sigma_{S=1}^{\gamma}(u_{s,1} \otimes v_{s,1}) \otimes \ldots \otimes (u_{s,p} \otimes v_{s,p}), (h_m h_{\tau(m)}^T)^{\otimes p} \rangle_F \quad (6B)$$

Note that, as decomposition of the learning model W, one of known decomposition methods, such as the singular-value decomposition method or the canonical polyadic decomposition can be used. A value of the rank $\gamma$ of the tensor, i.e. learning model, W can be freely set as long as the equation (4B) and the equation (6B) are equivalent to each other.

Because the internal product has linearity, the summation symbol $\Sigma$ can be taken out from the brackets in the equation (6B), making it possible to express the equation (6B) as the following equation (7):

$$IP = \Sigma_{S=1}^{\gamma} \langle (u_{s,1} \otimes v_{s,1}) \otimes \ldots \otimes (u_{s,p} \otimes v_{s,p}), (h_m h_{\tau(m)}^T)^{\otimes p} \rangle_F \quad (7)$$

Because the direct product is used as the tensor product, the following equation (8) is satisfied:

$$\langle a \otimes b, c \otimes d \rangle_F = (a^T c)(b^T d) \quad (8)$$

Equivalently transforming the equation (7) to another form in accordance with the equation (8) enables the following equation (9) to be obtained:

$$IP = \Sigma_{S=1}^{\gamma}(u_{s,1}^T h_m) \ldots (u_{s,p}^T h_m)(v_{s,1}^T h_{\tau(m)}) \ldots (v_{s,p}^T h_{\tau(m)}) \quad (9)$$

In the equation (9), the first vectors, $u_{s,1}, \ldots, u_{s,p}$ and the second vectors $v_{s,1}, \ldots, v_{s,p}$ can be expressed by boldface.

The equation (9) shows that the inner product IP of the image feature of the i-th divided segment DS and the selected learning model W for the i-th divided segment DS can be approximated as the predetermined number $\gamma$ of additions of the product of (1) The inner products of the p first vectors and the image feature $h_m$ (2) The inner products of the p second vectors and the image feature $h_{\tau(m)}$ Specifically, the equation (9) defined as a function of each of the learning models W is stored in the memory 12. Then, the identifier 25 inputs the image feature hm and the image feature h$\tau$(m) into the equation (9), thus obtaining, as an approximated scalar value, the result of the inner product of the column vector of the selected learning model W and the column vector of the image feature of the i-th divided segment DS.

In particular, as described above, the number of the rank $\gamma$ of the learning model W represents the number of additions of the product of (1) The inner products of the p first vectors and the image feature vector $h_m$ (2) The inner products of the p second vectors and the image feature vector $h_{\tau(m)}$ That is, the identifier 25 according to the exemplary embodiment is configured to change a value of the rank $\gamma$ in the equation (9) to be smaller than a reference value that enables the equation (4B) and the equation (6) obtained based on one of the known decomposition approaches to be equivalent to each other.

Let assume that the value of the learning model W set to be equal to the reference value is used in the equation (9). In this assumption, the number of calculations based on the equation (9) may increase while the calculation accuracy is sufficiently maintained, resulting in an increase of the processing load of the CPU 10.

In contrast, setting the value of the rank $\gamma$ of the learning model W to be smaller than the reference value of the rank $\gamma$ enables the number of calculations and the processing load of the CPU 10 based on the equation (9) to be reduced while the calculation accuracy is reduced.

Setting the value of the rank $\gamma$ used in the equation (9) to be excessively smaller may excessively reduce the calculation accuracy of the internal product. For this reason, the identifier 25 of the exemplary embodiment for example sets the value of the rank yin the equation (9) to be smaller as the calculation accuracy of the inner product becomes lower by 1 percent. In other words, limiting a value of the rank $\gamma$ of the learning model W to be smaller than the reference value enables calculation of the equation (9) to be set to the sum of a finite number of the obtained direct products.

Figure 5:
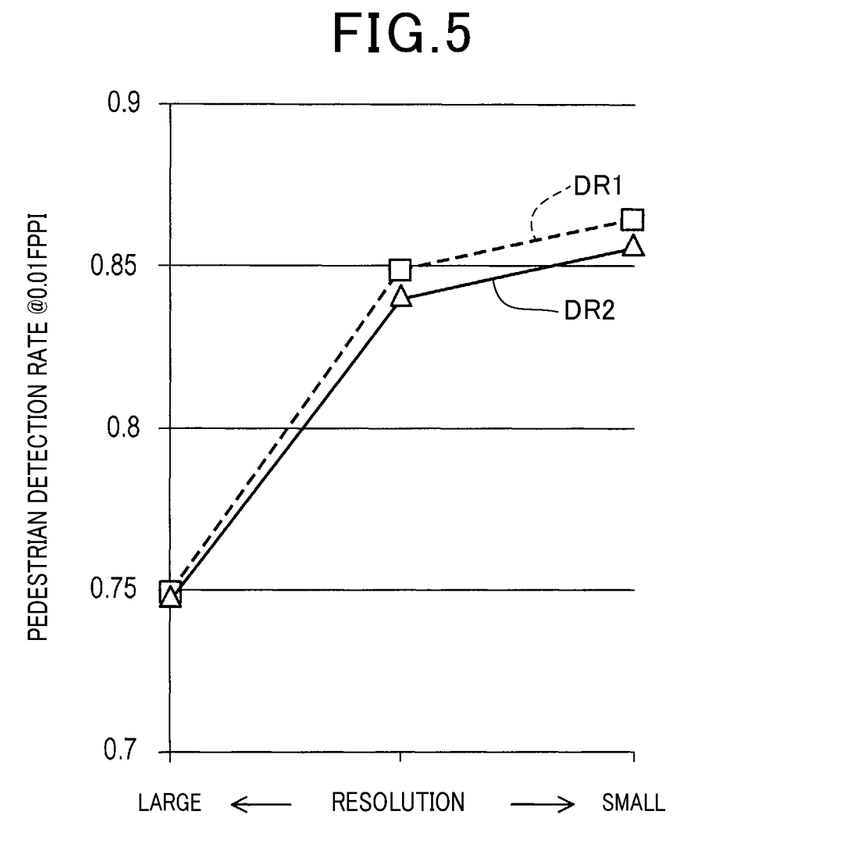
FIG. 5 is a graph schematically illustrating a pedestrian detection rate for a normal approach while the resolution of a selected divided segment is changed, and a pedestrian detection rate for an approximation approach while the resolution of a selected divided segment is changed according to the exemplary embodiment.

FIG. 5 schematically illustrates a pedestrian detection rate DR1 for the normal approach while the resolution of a selected divided segment is changed, and a pedestrian detection rate DR2 for the approximation approach while the resolution of a selected divided segment is changed. For example, manual adjustment of the rank $\gamma$ of each vector U, V in the approximation approach causes a value of the pedestrian detection rate DR2 in the approximation approach to be lower by 1 percent than a corresponding value of the pedestrian detection rate DR1 in the normal approach.

Figure 6:
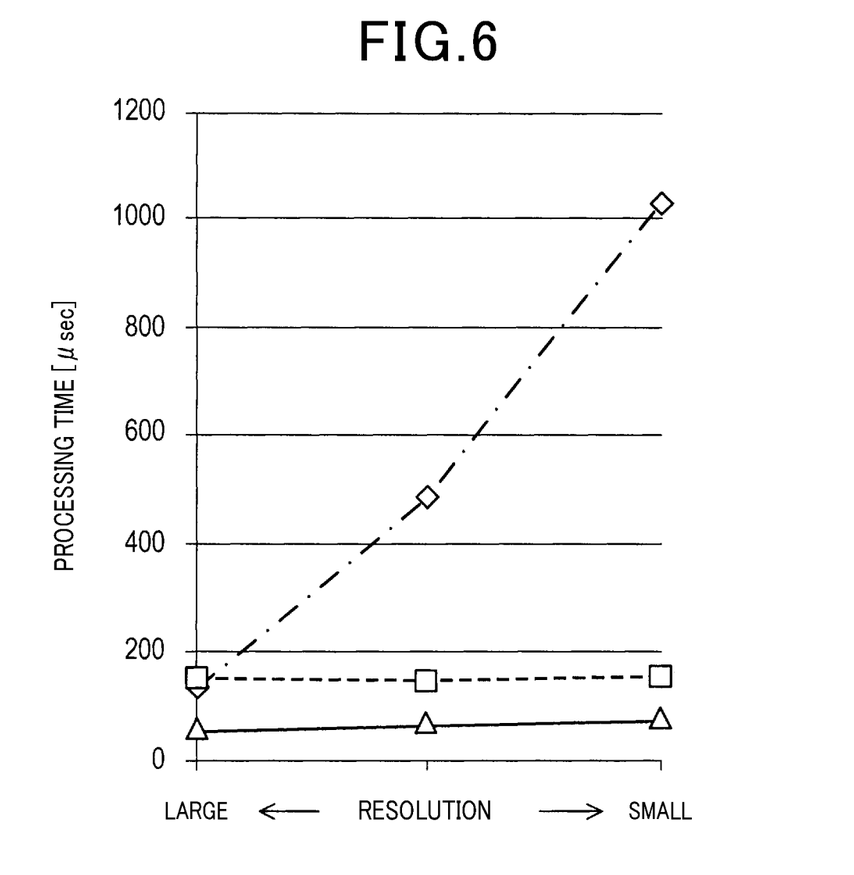
FIG. 6 is a graph schematically illustrating a processing time required for obtaining the normal approach illustrated in FIG. 5, and a processing time required for obtaining the approximation approach illustrated in FIG. 5.

Additionally, FIG. 6 schematically illustrates a processing time PT1 required for obtaining the normal approach illustrated in FIG. 5, and a processing time PT2 required for obtaining the approximation approach illustrated in FIG. 5. FIG. 6 clearly shows that the processing time required for obtaining the approximation approach illustrated in FIG. 5 is reduced to be substantially half the processing time required for obtaining the normal approach illustrated in FIG. 5. Additionally, FIG. 6 illustrates a processing time required for executing the technology disclosed in the published patent document described in the BACKGROUND section.

That is, as illustrated in FIG. 6, the processing time required for executing the normal approach results in sufficiently being lower. In addition, adjusting the value of the rank $\gamma$ of each vector U, V in the approximation approach enables the calculation accuracy of the inner product to be changed. That is, slightly changing the value of the rank $\gamma$ of each vector U, V in the approximation approach enables the processing time required for executing the approximation approach to be significantly reduced.

Next, the processor 10 sends, to the indicating unit 32, data indicative of the object identification results. This enables the indicating unit 32 to obtain the object identification results from the processor 10, and to indicate, to a driver of the vehicle 100, the received results using at least one of the display as images and/or messages, or the indicators as illuminated light.

Additionally, the processor 10 can send, to the ECU 33, the object identification results. This enables the ECU 33 to serve as a preventive safety unit to (1) Cause a braking system to perform autonomous braking of the vehicle 100

(2) Cause the indicating unit 32 to visibly and/or audibly output, to a driver of the vehicle 100, a message indicative of the object identification results (3) Cause a steering system of the vehicle 100 to perform autonomous steering of the vehicle 100 to thereby avoid collisions of the vehicle 100 with the identified target objects That is, the ECU 33 to serve as the preventive safety unit to perform (1) Mitigate damage due to collisions of the vehicle 100 with the identified target objects (2) Autonomous driving control of the vehicle 100 to prevent collisions of the vehicle 100 with the identified target objects As described in detail above, the image processing apparatus 1 of the exemplary embodiment is configured to extract, from a captured image, an image feature used for recognizing a target object in the captured image. For example, the image processing apparatus 1 includes the processor 10 comprised of, for example, the small-region feature calculator 22 and the tensor calculator 23.

The small-region feature calculator 22 includes a small region setter 22a configured to (1) Set, in a captured image, an object region in which a target object is predicted to be located (2) Divide the object region into small regions that are smaller in size than the object region, each of which is comprised of a predetermined number of pixels The small-region feature calculator 22 also includes a small region extractor configured to extract, from each small region, a small-region feature that has two or more feature parameters associated with the corresponding small region SR.

The tensor calculator 23 is configured to calculate a product of (1) A first feature, such as the small-region feature vector hm, representing the small-region feature of a first small region selected as a target region from the small regions SR, and (2) A second feature, such as the small-region feature vector h$\tau$ of the $\tau$-th small region, representing the small-region feature of a second small region that has a predetermined positional relationship with the first small region This configuration of the tensor calculator 23 obtains, based on the product of the first and second features, an image feature for the first small region, i.e. the target region.

Consequently, the image processing apparatus 1 is configured to obtain, for each small region, the imaging feature. This configuration therefore reduces an adverse effect on calculation of the imaging feature due to shifting or turning of the target object, as compared with obtaining, for each pixel of a captured image, a feature. This therefore increases the accuracy of calculating the image feature for the first small region.

The image processing apparatus 1 is configured to simply calculate the product of the first feature for the first small region and the second feature for the second small region to thereby obtain the image feature for the first small region. This therefore prevents the number of elements included in the image feature from excessively increasing As a first example, the small-region feature calculator 22 can be configured to extract, from each small region, a vector of the small-region feature associated with the corresponding small region SR. The tensor calculator 23 can be configured to calculate, as the product, the direct product between the first and second features, thus obtaining the small-region feature for each small region through a commonly usable direct product.

As a second example, the tensor calculator 23 can be configured to calculate, as the image feature of the first small region, i.e. target region, the power of the product, thus obtaining the image feature including the high-order features.

As a third example, the tensor calculator 23 can be configured to calculate, as the power of the product, the Kronecker power of the product. This configuration enables the higher-order features to be obtained based on the specific calculation of the Kronecker power of the product. In addition, calculating the power of the tensor, i.e. the Kronecker power of the product, which has nonlinear properties based on the Kronecker power of the product, thus improving the accuracy of obtaining the image features.

As a fourth example, the small-region feature calculator 22 can be configured to extract, from each small region, the luminance-value gradient direction histogram, for each of the pixels constituting the corresponding small region SR as the small-region feature that has two or more feature parameters associated with the corresponding small region SR. This configuration enables how the luminance value of each pixel is changed toward each of the adjacent pixels to be expressed as the small-region feature.

The processor 10 can also include the image-feature calculator 24. The image-feature calculator 24 includes, for example, a division setter 24a adapted to set the divided segments DS constituting the object region OR, each of the divided segments DS including a part of the small regions SR.

The image-feature calculator 24 also includes, for example, a division calculator 24b adapted to calculate the sum or average of the image features of the respective small regions SR included in each divided segment DS, and obtain the sum or average of the image features as an image feature for the corresponding divided segment DS.

This configuration makes it possible to limit an increase of the number of parameters included in the image feature obtained for each divided segment DS.

The processor 10 of the exemplary embodiment is installed in the vehicle 100, and is communicably connected to the imaging unit 31, the indicating unit 32, and the ECU 33. The imaging unit 31 captures an image of a region located around the vehicle 100. The indicating unit 32 is configured to indicate, to a driver of the vehicle 100, object recognition results sent from the processor 10. The ECU 33 is configured to perform preventive safety control of the vehicle 100 based on the object recognition results sent from the processor 10.

The processor 10 includes the input unit 16 that enables the processor 10 to communicate with the imaging unit 31, the memory 12 storing the feature extraction program, and the CPU 10 serving as a feature calculator.

The feature calculator is configured to (1) Read, from the memory 12, the feature extraction program (2) Divide a captured image obtained from the imaging unit into small regions each being smaller in size than the captured image (3) Extract, from each small region, a small-region feature that has two or more feature parameters associated with the corresponding small region SR (4) Calculate a first feature, such as the small-region feature vector hm, of a first small region selected as a target region from the small regions SR (5) Calculate a second feature, such as the small-region feature vector hτ of the τ-th small region, of a second small region that has a predetermined positional relationship with the first small region (6) Obtain, based on the product of the first and second features, an image feature for the first small region, i.e. the target region (7) Recognize the target object in accordance with the image feature for the target region The processor 10 further includes the output unit 17 serving as a transmission circuit for transmitting, to the at least one of the indicating unit 32 and the ECU 33, data including, for example, the recognition results of the target object.

For example, the small-region feature calculator 22, the tensor calculator 23, and the image-feature calculator 24 serve as the feature calculator.

This configuration makes it possible to perform, based on the object recognition results, preventive safety control of the vehicle 100 and/or giving, to a driver of the vehicle 100, a message for safety of the vehicle 100.

Modifications

The exemplary embodiment of the present disclosure has been described, but the present disclosure is not limited to the above exemplary embodiment, and can be variably modified.

The tensor calculator 23 of the exemplary embodiment is configured to calculate the direct product of the small-region feature vectors, but the present disclosure is not limited thereto. Specifically, the tensor calculator 23 can be configured to calculate a product of scalar values, or a product of matrixes. The tensor calculator 23 can be configured to calculate a cross product of the small-feature vectors, such as an outer product. For example, the following describes an example of such a cross product of vectors a and b in the following equation (10):

$$a \times b = \begin{pmatrix} a_2 b_3 - a_3 b_2 \\ a_3 b_1 - a_1 b_3 \\ a_1 b_2 - a_2 b_1 \end{pmatrix} \tag{10}$$

$$\text{where } a = \begin{pmatrix} a_1 \\ a_2 \\ a_3 \end{pmatrix}, \text{ and } b = \begin{pmatrix} b_1 \\ b_2 \\ b_3 \end{pmatrix}$$

The tensor calculator 23 can be configured to calculate, without the p-th order Kronecker power of the tensor 23, a power of matrixes in accordance with the following equation (11):

$$A^3 = AAA \tag{11}$$

The processor 10 can be configured not to include a task of identifying the type of objects, but to include a task of calculating an image feature in each divided segment.

The functions of one element in the exemplary embodiment can be distributed as plural elements, and the functions that plural elements have can be combined into one element. At least part of the structure of the exemplary embodiment can be replaced with a known structure having the same function as the at least part of the structure of the exemplary embodiment. A part of the structure of exemplary embodiment can be eliminated. All aspects included in the technological ideas specified by the language employed by the claims constitute embodiments of the present disclosure.

The present disclosure can be implemented by various embodiments in addition to the image processing apparatus; the various embodiments include systems each including the image processing apparatus, programs for serving a computer as the image processing apparatus, storage media, such as non-transitory storage media storing the programs, and image processing methods.

While the illustrative embodiment of the present disclosure has been described herein, the present disclosure is not limited to the embodiment described herein, but includes any and all embodiments having modifications, omissions, combinations (e.g., of aspects across various embodiments), adaptations and/or alternations as would be appreciated by those having ordinary skill in the art based on the present disclosure. The limitations in the claims are to be interpreted broadly based on the language employed in the claims and not limited to examples described in the present specification or during the prosecution of the application, which examples are to be construed as non-exclusive.

What is claimed is:

1. A feature extraction apparatus for extracting an image feature to be used to recognize a target object in a captured image, the feature extraction apparatus comprising:
a small region setter configured to divide an object region set in a captured image into small regions smaller in size than the object region, a target object being included in the object region;
a small region extractor configured to extract, from each of the small regions, a small-region feature that has two or more feature parameters associated with the corresponding small region; and
a feature calculator configured to:
select a first small region from among the small regions as a target region;

calculate a product of a first feature representing the small-region feature of the first small region, and a second feature representing the small-region feature of a second small region among the small regions, in which the second small region has a predetermined positional relationship with respect to the first small region; and obtain, based on the product of the first feature and the second feature, the image feature of the first small region, as the image feature of the target region, to recognize the target object in the captured image, wherein the feature calculator obtains the image feature of each of the small regions by selecting each of the small regions as the target region.

2. The feature extraction apparatus according to claim 1, wherein:

the small region extractor is configured to extract, from each of the small regions, a vector of the small-region feature associated with the corresponding small region; and the feature calculator is configured to calculate, as the product, a direct product between the first and second features.

3. The feature extraction apparatus according to claim 1, wherein:

the feature calculator is configured to calculate, as the image feature of the target region, a power of the product.

4. The feature extraction apparatus according to claim 3, wherein:

the feature calculator is configured to calculate, as the power of the product, a Kronecker power of the product.

5. The feature extraction apparatus according to claim 1, wherein:

the small region extractor is configured to extract, from each of the small regions, a histogram of luminance-value gradient directions for each of pixels constituting the corresponding small region as the small-region feature that has the two or more feature parameters associated with the corresponding small region.

6. The feature extraction apparatus according to claim 1, further comprising:

a division setter configured to set divided segments constituting the object region, each of the divided segments including a part of the small regions; and a division calculator configured to calculate a sum or average of the image features of the respective small regions included in each divided segment to correspondingly obtain the sum or average of the image features as a divided-segment image feature for the corresponding divided segment.

7. The feature extraction apparatus according to claim 1, wherein:

the target region comprises a plurality of pixels.

8. A feature extraction method executable by a computer, the feature extraction method comprising:

dividing an object region set in a captured image into small regions smaller in size than the object region, a target object being included in the object region;

extracting, from each of the small regions, a small-region feature that has two or more feature parameters associated with the corresponding small region;

selecting a first small region from among the small regions as a target region;

calculating a product of the first feature representing the small-region feature of a first small region, and a second feature representing the small-region feature of a second small region in-among the small regions, in which the second small region has a predetermined positional relationship with respect to the first small region; and obtaining, based on the product of the first feature and the second feature, an image feature of the first small region, as the image feature of the target region, to recognize the target object in the captured image, wherein the image feature of each of the small regions is obtained by selecting each of the small regions as the target region.

9. An object recognition apparatus installable in a vehicle, and communicably connected to an imaging unit, an indicating unit, and an electronic control unit, the imaging unit being configured to capture an image of a region located around the vehicle, the indicating unit being configured to indicate, to a driver of the vehicle, an object recognition result, the electronic control unit being configured to perform preventive safety control of the vehicle based on the object recognition result, the object recognition apparatus comprising:

an input unit that enables the object recognition apparatus to communicate with the imaging unit;

a first memory configured to store a feature extraction program;

a feature calculator, the feature calculator being configured to:

read, from the first memory, the feature extraction program;

divide a captured image obtained from the imaging unit into small regions each being smaller in size than the captured image;

extract, from each of the small regions, a small-region feature that has two or more feature parameters associated with the corresponding small region;

select a first small region from among the small regions as a target region;

calculate a first feature representing the small-region feature of the first small region, and a second feature representing the small-region feature of a second small region among the small regions, in which the second small region has a predetermined positional relationship with respect to the first small region;

obtain, based on a product of the first feature and the second feature, an image feature of the first small region, as the image feature of the target region, to recognize the target object in the captured image, the image feature of each of the small regions being obtained by selecting each of the small regions as the target region; and recognize the target object in the captured image in accordance with the image feature for the target region; and a transmission unit configured to transmit, to at least one of the indicating unit and the electronic control unit, data including an object recognition result obtained by the feature calculator.

10. The object recognition apparatus according to claim 9, further comprising:

a second memory storing an identification program and a comparative reference tensor; and an identifier configured to:

read, from the second memory, the identification program and comparative reference tensor;

calculate a finite number of vectors as an approximation of an inner product of the image feature of the target region and the comparative reference tensor;
calculate a predetermined number of additions of the product of products of the respective vectors and the small-region feature of the target region to accordingly calculate a scalar value; and
identify the target object based on the scalar value and the comparative reference tensor.

* * * * *